United States Patent
Lakkis et al.

(10) Patent No.: US 8,457,180 B2
(45) Date of Patent: *Jun. 4, 2013

(54) SYSTEMS AND METHODS FOR INDOOR POSITIONING

(75) Inventors: Ismail Lakkis, San Diego, CA (US); Hock Law, San Diego, CA (US)

(73) Assignee: Adeptence, LLC, Los Angeles, CA (US)

( * ) Notice: Subject to any disclaimer, the term of this patent is extended or adjusted under 35 U.S.C. 154(b) by 26 days.

This patent is subject to a terminal disclaimer.

(21) Appl. No.: 13/151,246

(22) Filed: Jun. 1, 2011

(65) Prior Publication Data

US 2012/0002702 A1    Jan. 5, 2012

Related U.S. Application Data

(60) Provisional application No. 61/350,434, filed on Jun. 1, 2010.

(51) Int. Cl.
*H04B 1/38* (2006.01)

(52) U.S. Cl.
USPC ........... 375/219; 375/316; 375/295; 375/220; 375/222; 375/354; 375/356; 375/359; 375/362; 375/363; 375/364; 375/365; 375/366; 375/367; 375/368

(58) Field of Classification Search
USPC ................. 375/316, 295, 219, 220, 222, 354, 375/356, 359, 362, 363, 364, 365, 366, 367, 375/368

See application file for complete search history.

(56) References Cited

U.S. PATENT DOCUMENTS

| | | | | |
|---|---|---|---|---|
| 5,892,757 A | * | 4/1999 | Norrell et al. | 370/292 |
| 6,812,824 B1 | * | 11/2004 | Goldinger et al. | 340/10.1 |
| 8,081,072 B2 | * | 12/2011 | Scalisi et al. | 340/539.13 |
| 8,152,053 B2 | * | 4/2012 | Pietrzyk et al. | 235/375 |
| 8,331,425 B2 | * | 12/2012 | Nicolas et al. | 375/219 |
| 2003/0013146 A1 | * | 1/2003 | Werb | 435/9 |

(Continued)

FOREIGN PATENT DOCUMENTS

KR    10-0757860 B1    9/2007

OTHER PUBLICATIONS

H. Liu et al., "Survey of Wireless Indoor Positioning Techniques and Systems," IEEE Transactions on Systems, Man, and Cybernetics—Part C: Applications and Reviews, vol. 37, No. 6, Nov. 2007, 14 pages.

(Continued)

*Primary Examiner* — Siu Lee
(74) *Attorney, Agent, or Firm* — Procopio, Cory, Hargreaves & Savitch LLP; Noel C. Gillespie

(57) ABSTRACT

A positioning system comprises a plurality of controllers, each controller comprising a wideband receiver and a narrow band transmitter, the each controller configured to receive a wideband positioning frame using the wideband receiver from one or more devices and to transmit acknowledgement frames using the narrow band transmitter that include timing and control data for use by the devices to establish timing for transmission of the positioning frame; and at least one device comprising a wideband transmitter and a narrow band receiver, the device configured to transmit a positioning frame to the plurality of controllers using the wideband transmitter and to receive an acknowledgement frame from one or more controllers using the narrow band receiver, extract timing and control information from the frame, and adjust the timing and synchronization of the wideband transmitter using the timing and control information.

27 Claims, 6 Drawing Sheets

U.S. PATENT DOCUMENTS

2003/0034887 A1 2/2003 Crabtree et al.
2007/0139200 A1 6/2007 Yushkov et al.
2007/0248180 A1 10/2007 Bowman et al.
2011/0295102 A1* 12/2011 Lakkis et al. ................. 600/407

OTHER PUBLICATIONS

International Search Report and Written Opinion issued in PCT/US2011/038829 on Feb. 29, 2012, 9 pages.

* cited by examiner

SYSTEMS AND METHODS FOR INDOOR POSITIONING

RELATED APPLICATION INFORMATION

This application claims priority under 35 U.S.C. 119(e) to U.S. Provisional Patent Application Ser. No. 61/350,434, file Jun. 1, 2010, and entitled "Indoor Positioning System," which is Incorporated herein by reference in its entirety as if set forth in full.

BACKGROUND

1. Technical Field

The embodiments described herein are related to wireless communication and in particular to systems and methods for wireless indoor positioning.

2. Related Art

Wireless indoor positioning systems have become more popular in recent years. These systems are commonly used for asset tracking and inventory management. For example, these systems have been used for location detection of products in a warehouse, location detection of medical personnel or equipment in a hospital, location detection of firemen in a burning structure, and tracking of maintenance equipment scattered over a facility or compound.

Numerous wireless technologies have been developed or adapted for use in indoor positioning applications. These technologies include WLAN, RFID, UWB, ZigBee, Bluetooth, HomeRF, GPS, wireless assisted GPS, etc. In general, these technologies and systems based thereon tradeoff complexity and power requirements for range. In other words, the lower the power, the shorter the distance the over which the system will work effectively. FIG. 1 is a diagram taken from "Survey of Wireless Indoor Positioning Techniques and Systems," H. Lui et al., IEEE Transactions on Systems, Man, and Cybernetics—Part C: Applications and Reviews, Vol. 37, No. 6, November 2007, which is incorporated herein by reference. The systems on the left tend to be low power systems, while the systems on the right are high power systems. As can be seen, the low power systems work over a relatively short range.

While many systems and techniques for wireless indoor positioning have been developed, there are still several deficiencies that limit adoption and deployment. Ideally, an indoor positioning system would comprise tracking devices that require very little power to operate so that the devices can be made very small, very inexpensively, and so that the devices can last longer on a single battery. The consumer of power within a tracking device is the transceiver. The further a device must transmit, the higher the transmit power required, which translates directly into higher power consumption within the device. As a result, very low power systems, such as UWB systems have been deployed. A UWB system can, for example, transmit effectively at transmit powers as low as −10 db.

But in order to be effective, such low power systems typically require very precise timing. This requires a high quality crystal oscillator to control the devices timing, which drives up cost, size, and power requirements. Thus, conventional systems cannot provide the extremely low power operation, and accuracy that is required for many applications.

SUMMARY

Methods for low power indoor tracking systems are described herein.

According to one aspect, a positioning system comprises a plurality of controllers, each controller comprising a wideband receiver and a narrow band transmitter, the each controller configured to receive a wideband positioning frame using the wideband receiver from one or more devices and to transmit acknowledgement frames using the narrow band transmitter that include timing and control data for use by the devices to establish timing for transmission of the positioning frame; and at least one device comprising a wideband transmitter and a narrow band receiver, the device configured to transmit a positioning frame to the plurality of controllers using the wideband transmitter and to receive an acknowledgement frame from one or more controllers using the narrow band receiver, extract timing and control information from the frame, and adjust the timing and synchronization of the wideband transmitter using the timing and control information.

According to another aspect, A positioning system comprises a plurality of controllers, each controller comprising a wideband receiver and a narrow band transmitter, the each controller configured to receive a wideband positioning frame using the wideband receiver from one or more devices and to transmit acknowledgement frames using the narrow band transmitter that include timing and control data for use by the devices to establish timing for transmission of the positioning frame; at least one device comprising a wideband transmitter and a narrow band receiver, the device configured to transmit a positioning frame to the plurality of controllers using the wideband transmitter and to receive an acknowledgement frame from one or more controllers using the narrow band receiver, extract timing and control information from the frame, and adjust the timing and synchronization of the wideband transmitter using the timing and control information; and a server interfaced with the plurality of controllers, the server configured to maintain synchronization between the plurality of servers These and other features, aspects, and embodiments are described below in the section entitled "Detailed Description."

BRIEF DESCRIPTION OF THE DRAWINGS

Features, aspects, and embodiments are described in conjunction with the attached drawings, in which.

DETAILED DESCRIPTION

The embodiments described herein relate to dual band tracking systems in which an array of controllers is used to track the position of a plurality of devices. The controllers use a narrow band technology/protocol to communicate with the devices, while the devices use a low power, wide band technology/protocol to communicate with the controllers. The number of devices to be tracked can be relatively large, while a relatively small number of controllers can be required.

The controllers can be fixed, e.g., within a building or room. Power is generally not a concern, so the controllers can transmit at very high power, e.g., they can transmit at up to 1 W. Further, the receiver, which is a wideband receiver configured to receive the wideband transmissions from the devices, can be supplied with high power such that it can more easily detect and decode the very low power signals transmitted from the devices.

The high power, narrow band transmitter in the controllers can be used to transmit timing and synchronization information to the devices so that the devices themselves do not require a high precision crystal. Thus they can be very low power, low cost, small devices that last for a long time without the need to replace a battery or replace the tracking device. In fact, a printed battery can even be used in certain implementations.

Figure 1:
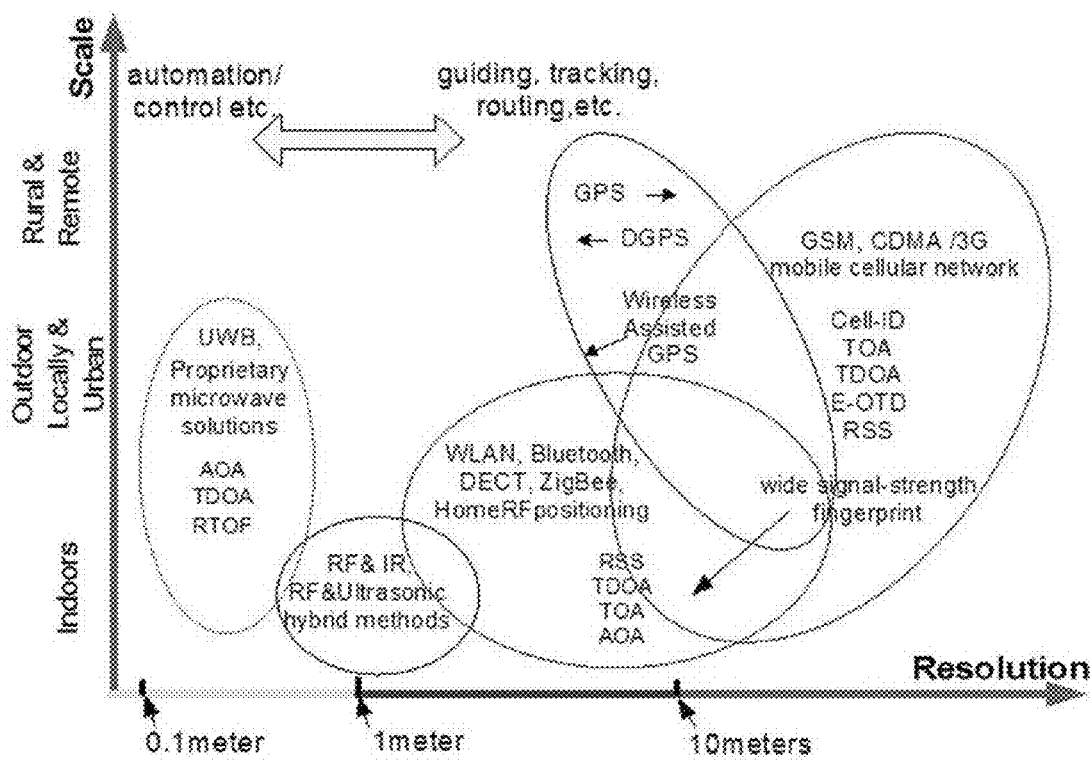
FIG. 1 is a diagram illustrating various indoor positioning systems in terms of range.
Figure 2:
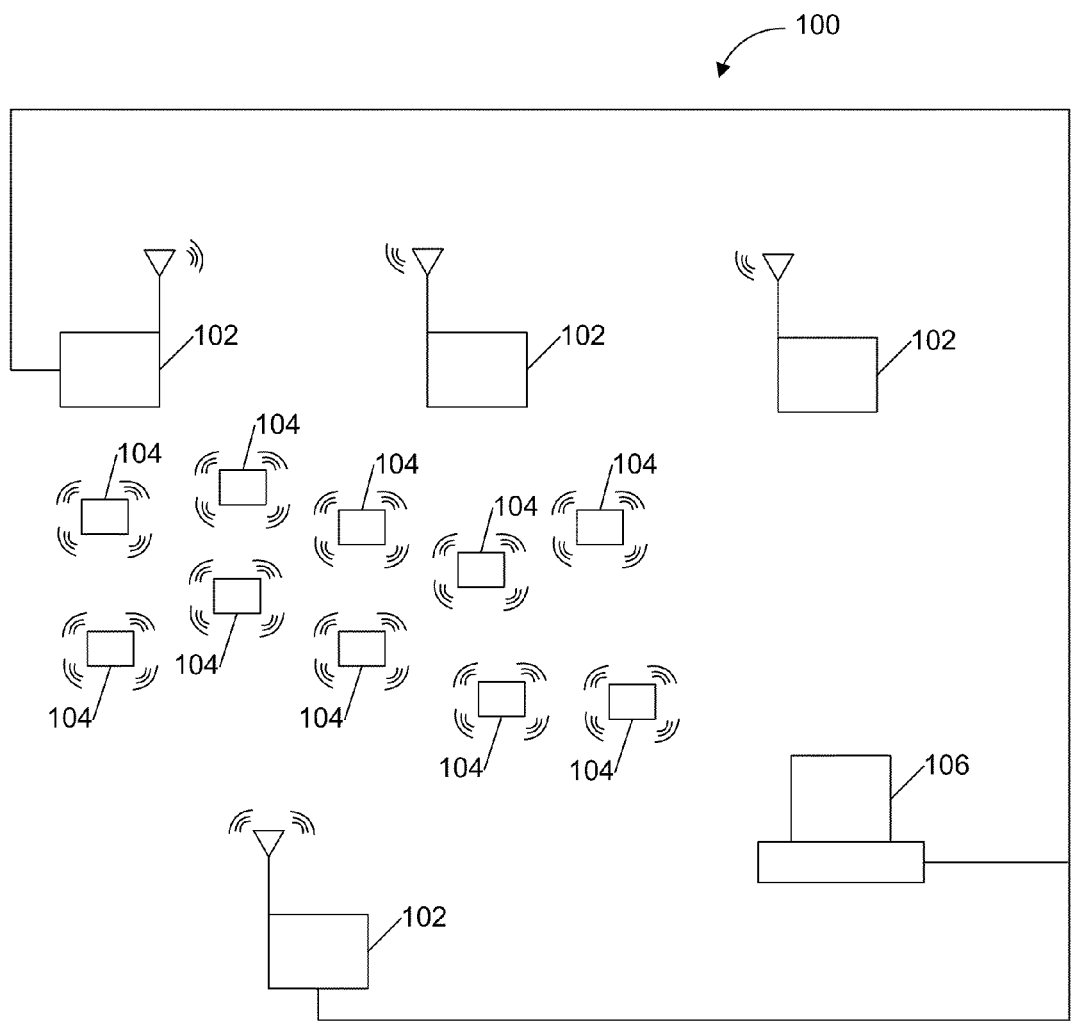
FIG. 2 is a diagram illustrating an example positioning system in accordance with one embodiments.

FIG. 2 is a diagram illustrating an example embodiment of a positioning system 100 configured in accordance with one embodiment. System 100 includes several controllers 102 and a plurality of devices 104 that are being tracked. Devices 104 are attached to an item being tracked and are described in more detail below. Devices 104 can be configure to broadcast transmissions so that they can be received by multiple controllers 102. In certain embodiments, triangulation techniques can be used to determine the position of a particular device 104. Thus, each device 104 would need to communicate with at least three controllers 102.

Controllers 102 can be interfaced with a server 106 that can be configured to maintain precise synchronization between controllers 104 and to process data received from devices 104. Controllers 102 can be interfaced with server 106 via a wireless connection. But it can be preferable for the interface between controllers 102 and server 106 to be a wired connection, such as an Ethernet connection.

Figure 3:
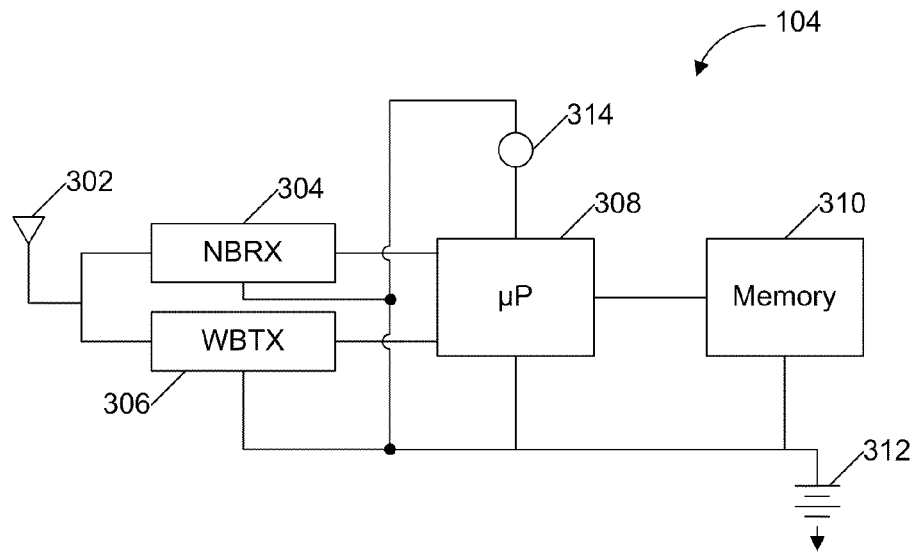
FIG. 3 is a block diagram illustrating an example tracking device that can be included in the system of FIG. 2.

FIG. 3 is a block diagram illustrating an example tracking device 104 in more detail. Device 104 can comprise an antenna 302 configured to transmit wideband signals and receive narrow band signals. In certain embodiments, device 104 can comprise two antennae, one for receiving and one for transmitting. But because very precise timing can be used, device 104 does not need to transmit and receive at the same time. Thus, a single antenna can be used, reducing complexity, size, cost, etc.

Antenna 302 is then interfaced with wideband transmitter 304 and narrow band receiver 306. It will be understood that transmitter 304 can comprise the circuitry required for transmission. For example, transmitter 304 can comprise the filters, pulse shapers, modulators, amplifiers, digital to analog converters, etc., required for a specific transmitter design. Of course, transmitter 304 is a very low power transmitter, thus there is no need for a high power amplifier. Moreover, low power, all digital ultra wideband transmitter designs exist. Similarly, receiver 306 can comprise all of the circuitry required to receive the narrow band communications from controllers 104.

Transmitter 304 and receiver 306 can be interfaced with a processor or microcontroller 308 that can be configured to control the operation of device 104, decode information included on signals received by receiver 306, and generate information to be transmitted using transmitter 304. Processor 308 can be interfaced with memory 310, which can store instruction for processor 308 and data, such as an identifier. In many applications, a very limited amount of data is communicated, thus limiting the memory requirements.

A crystal 314 can also be included to control the timing of processor 308. As noted above, the crystal 314 can be a very inexpensive, low power crystal as a result of the systems and methods described herein.

It should also be noted that device 104 does not require a lot of power in the receiver, because controllers 102 can transmit at very high power, which can aid the ability of device 104 to receive and effectively decode the received narrow band signals.

Additionally, a power source 312 can be included and can be configured to power the components included in device 104. Power source 312 is often a battery, but because device 104 uses very low power for transmission, power source 312 does not have to have a large capacity in order to provide a relatively long lifetime. In fact, in certain embodiments, power source 312 can be a printed battery.

It should also be noted that antenna 302 can also be printed. In general, device 104 can be constructed as, or included in a sticker tag or label, similar to passive RFID transponders. Such tags typically comprise a base layer, a print layer on which the antenna, and in this case possibly power source, and other circuit interconnects and components are printed, a circuit layer on which integrated circuits are attached, and then a top layer. Often, many of these layers, such as the base layer, print layer, and circuit layer are combined into a single layer. Certainly, the ability to use a print battery allows for the reduction of potential layers and overall size of the device 104.

Figure 4:
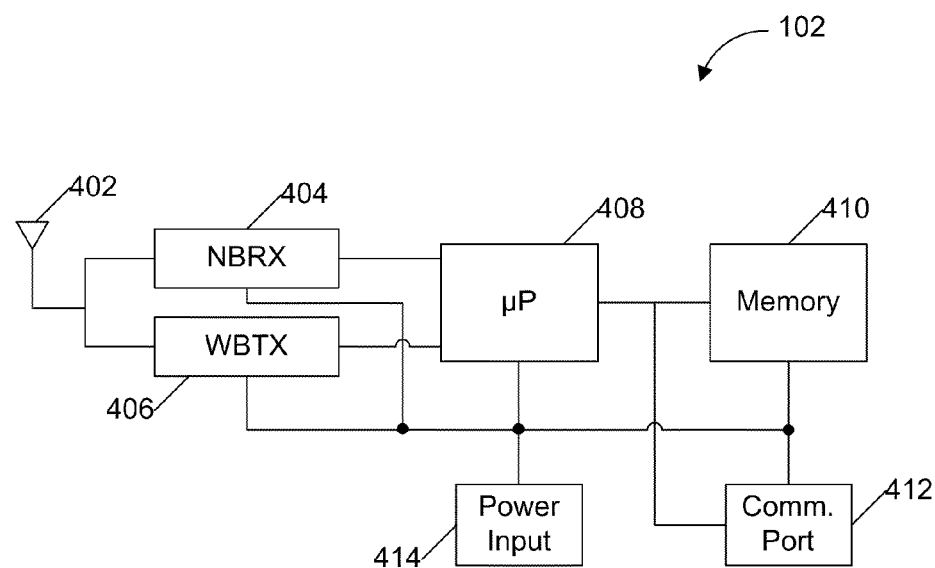
FIG. 4 is a block diagram illustrating an example controller that can be included in the system of FIG. 2.

FIG. 4 is a block diagram illustrating an example controller 102 according to one embodiment. As can be seen, the diagram of controller 102 is very similar to that of device 104; however, controller 102 includes a narrow band transmitter 404 configured to communicate with the narrow band receivers 306 included in devices 104, and a wideband receiver 406 configured to receive signals from the wideband transmitters 304 included devices 104. Again, controller 102 can include a single antenna 402 or dual antennae. In fact, since controllers 102 are less resource constrained, it may be feasible and preferable to include separate transmit and receive antennae.

Both processor 408 and memory 410 can be larger and more powerful than the corresponding processor 308 and memory 310 included in devices 104; however, because much of the processing and synchronization can occur on server 106, there is not necessarily a need for large amount so of processing power and memory within controllers 104. As such, controllers 102 can include a communications port 412, such as an Ethernet port for communications with server 106 and possible with other controllers 102.

Controllers 102 can also include a power input that can provide power from an external supply such as the building or enclosures power system. It will be understood that power input block 414 can include some or all of the power circuits required, such as power conversion, regulation, over voltage protection, etc. Because power is not a concern for controllers 102, power input 414 can be configured to provide high power levels to both transmitter 404 and receiver 406. This allows transmitter 404 to transmit with significantly high power such that low power devices 104 can still effectively receive the transmit signals even though they have very low power receivers. Similarly, receiver 406 can be supplied with very high power allowing it to receive and detect information included in the very low power signals received from low power transmitters 304.

One of skill in the art will understand the basic techniques and designs required to implement a device and a controller as described, and in particular the receivers and transmitters circuits required. Although, specific coding and decoding algorithms, modulation techniques, etc., needed for optimum performance are not necessarily straight forward.

Figure 5:
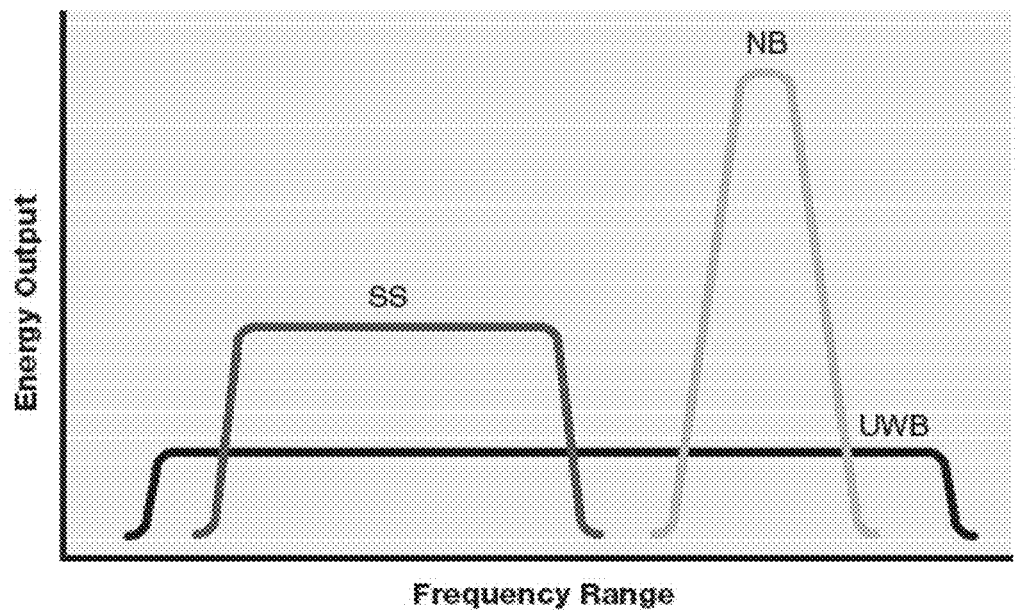
FIG. 5 is a diagram demonstrating the bandwidth and frequency ranges of UWB, narrow band, and spread spectrum systems.

Thus, the system is a dual band system, i.e., a higher powered, narrow band system in the down link, and a low power, wide band system in the up link. Thus, a narrow band communication system/protocol, e.g., in the 2.4 GHz Industrial Scientific and Medical (ISM) band can be chosen for the down link portion. Ultra-WideBand (UWB) can be chosen for the uplink. FIG. 5 is a diagram demonstrating the bandwidth and frequency ranges of UWB, narrow band, and spread spectrum systems. As can be seen, the UWB signal comprises a very wide bandwidth and very low power compared, e.g., to the narrow band signal.

Accordingly, in certain embodiments, devices 104 can comprise a low power low cost device comprising a UWB transmitter 304 and a narrowband ISM receiver 306, and controllers 102 can comprise a UWB receiver 406 and a narrowband ISM transmitter 404. The UWB frequency band is very wideband and is used for positioning whereas the narrowband spectrum is used for control and data communication. The controllers 102 are connected to a backbone network and are highly synchronized. This allows controllers 102 to provide timing to devices 104, so that devices 104 do not require high cost, precision crystals.

Various implementations of UWB technology differ in frequency band and signal characteristics. The most common UWB technology is based on the WiMedia Alliance recommendations. WiMedia's UWB technology is an ISO-published radio standard for high speed wireless connectivity. UWB offers an unsurpassed combination of high data throughput and low energy consumption using bands within the frequency range of 3.1-10.6 GHz in the U.S. and many other parts of the world.

Figure 6:
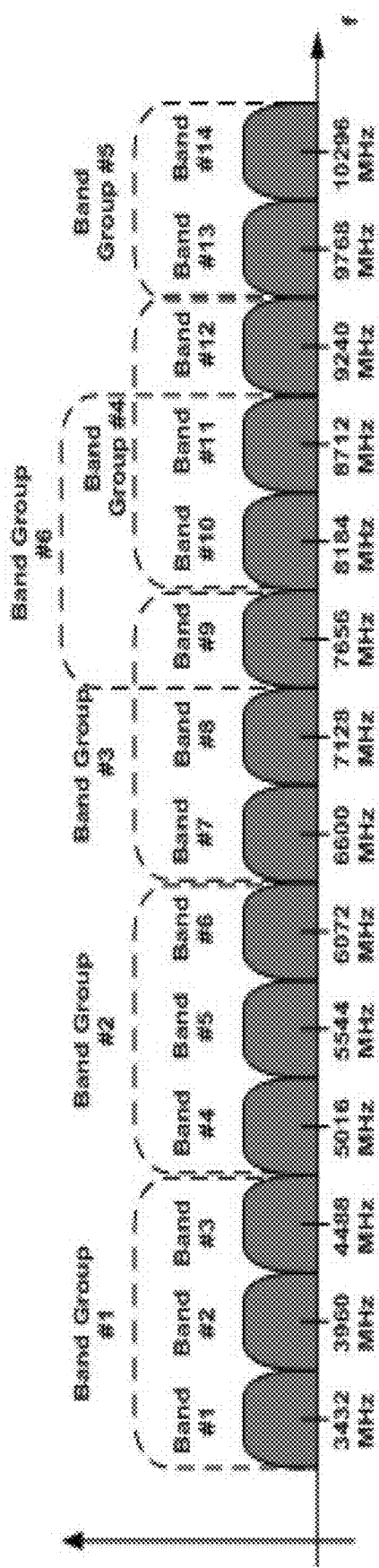
FIG. 6 is a diagram illustrating how the UWB physical layer divides the spectrum.

On the physical layer, the spectrum is divided into 14 bands and 6 band groups, each band group consisting of 3 bands as illustrated in FIG. 6. The WiMedia standard also specifies a multi-band orthogonal frequency division multiplexing with or 110 sub-carriers per channel, i.e., 4.125 MHz bandwidth per sub-carrier, a channel bandwidth of 528 MHz and very low broadcast power that allows same channel coexistence with narrower band devices such as 802.11a/b/g/n radios. UWB's much high bandwidth results in higher data throughput, coupled with a very low RF output power. UWB typically offers a communication range of up to 30 feet.

Figure 7:
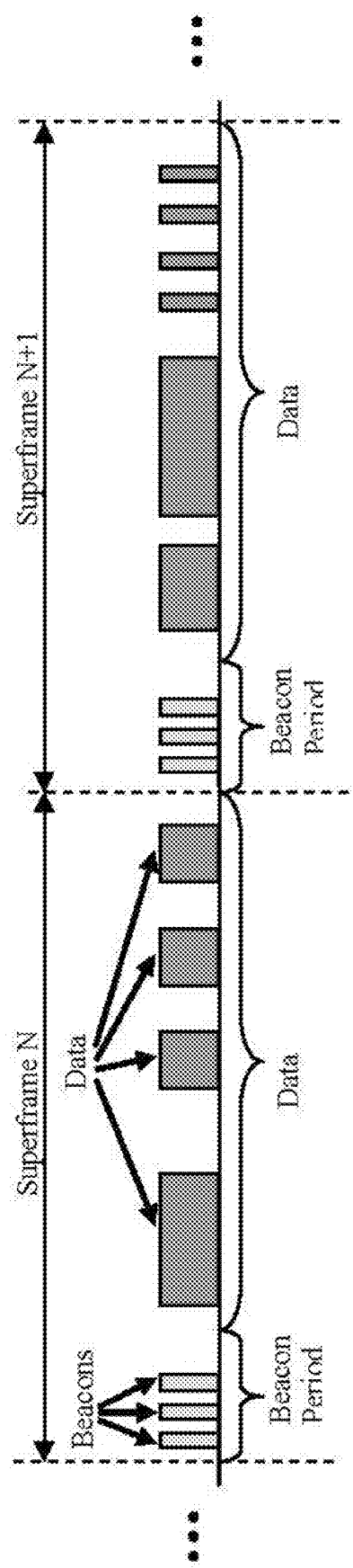
FIG. 7 is a diagram illustrating an example superframe of a UWB system.

The basic UWB timing for the network is the superframe. The superframe consists of a "beacon-period" and a "data period" that includes fixed duration time-slots as illustrated in FIG. 7. The beacon frame are transmitted by each UWB device 104 to ensure cooperative behavior among all devices. The beacon frame provides basic timing information such as superframe start time as well as conveying reservation and scheduling information for medium access.

In certain embodiments, during a time slot in the data period, a device 104 can transmit a positioning frame in the UWB spectrum. This positioning frame can be used by system 100 to determine the position of the device 104. For example, a device 104 can broadcast its positioning frame, which can be picked up by three or more controllers 102. The positioning frame can include a time stamp that indicates when the frame was sent. By comparing the time stamp to the time when the frame was received, the controllers, or server 106 can determine how far the device 104 is from each controller 102. If the frame is received by three controllers, then triangulation can be used to determine the position of the device.

As mentioned, the devices 104 can comprise low cost, low precision crystals. Accordingly, the crystals will drift and the timing on devices 104 will be off. But the controllers can transmit super frame timing information to the devices 104, which can allow the devices 104 to reset their timing and eliminate any such timing skew or drift.

The basic protocol can include the devices 104 transmitting their positioning frame, using the UWB spectrum, and the controllers 102 transmitting acknowledgement frame in return, suing the narrow band spectrum. The acknowledgment frame can comprise timing and other information that allows the devices 104 to reset their timing. In certain embodiments, a device 104 can receive acknowledgement from up to four controllers 102. The acknowledgments can, depending on the implementation, be consolidated in a single acknowledgment sent from one of the controllers 102, e.g., as dictated by server 106.

If the acknowledgements indicate reception by less than three controllers 102, then this can cause the device 104 to retransmit it s positioning frame.

The positioning frame can comprise at least a preamble and a header, and an optional data portion depending on the implementation. The frame can be modulated using ternary modulation, i.e. +1, 0, and −1 with a predetermined PRF (Pulse Repetition Frequency). The header can comprise a device ID field, possibly a time stamp, and can be encoded and protected with a CRC. The preamble can comprise a sync field and a start frame delimiter field. Each of these two fields can comprise data spread using a common spreading sequence. The common spreading sequence may consist of a ternary sequence with good correlation properties such as Ipatov and Justesen ternary sequence. Different devices 104 can use a common ternary sequence or different ternary sequences depending on the implementation.

Further reductions in power can be achieved in devices 104 by turning-on the UWB transmitter 304 only during the time-slot where the device 104 is attempting the positioning and shutting down the transmitter 304 after finishing the frame transmission. Each controller 102 has a much higher complexity and has to be able to receive and demodulate frames sent from multiple devices 104 typically during different time slots. A more advanced controller 102 can be able to demodulate frames sent in the same time-slot as well.

In certain embodiments, after sending the positioning frame, the device 104 waits for a predetermined period and turns on its narrow-band receiver 306 and waits for an acknowledgment frame from one or more controllers 102. In addition to successfully acknowledging successful reception of the frame, the acknowledgment frame can comprise control data and information data sent by the controller 102.

If a device 104 does not receive an acknowledgment within a given time-out period, the device 104 can wait for a random time and attempt retransmission of the positioning packet in a different time-slot. The time-slot number can, e.g., be based on slotted-aloha protocol with exponential backoff.

As noted, timing can be established using a superframe structure established by the controllers 102 in the narrowband spectrum. The superframe is divided into two parts: A beacon period; and a time-slotted period. The beacon period can be divided into equal size time-slots. During a beacon time-slot, one of the controllers 102 can transmit a beacon frame comprising information about superframe timing and the structure of the superframe. Different controllers 102 can use different time-slots of the beacon and do not overlap with each other. The beacon frame can comprise as well time 0 of the UWB time axis that sets the time-slots boundary in the UWB spectrum. Thus, using this information, the devices 104 can maintain proper timing. Further, the acknowledgement frame sent by the controller 102 in a response to the positioning frame should be aligned with the boundary of a time-slot in the time-slotted narrowband superframe.

Server 106 can comprise one or multiple servers, routers, databases, application, programs, code, user interfaces, etc., to allow server 106 to decode the information received from controllers 102, and ultimately devices 104. Server 106 can, therefore, perform such tasks as tracking the location of devices 104, tracking their movement, detecting the entry or exit of a device 104, etc.

It will be understood that some or all of the functions of server 106 can be implemented by or included in one or more controllers 102.

While certain embodiments have been described above, it will be understood that the embodiments described are by way of example only. Accordingly, the systems and methods described herein should not be limited based on the described embodiments. Rather, the systems and methods described herein should only be limited in light of the claims that follow when taken in conjunction with the above description and accompanying drawings.

What is claimed:

1. A positioning system comprising:
   a plurality of controllers, each controller comprising a wideband receiver and a narrow band transmitter, the each controller configured to receive a wideband positioning frame using the wideband receiver from one or more devices and to transmit acknowledgement frames using the narrow band transmitter that include timing and control data for use by the devices to establish timing for transmission of the positioning frame; and
   at least one device comprising a wideband transmitter and a narrow band receiver, the device configured to transmit the positioning frame to the plurality of controllers using the wideband transmitter and to receive the acknowledgement frame from one or more controllers using the narrow band receiver, extract timing and control information from the acknowledgement frame, and adjust a timing and synchronization of the wideband transmitter using the timing and control information.

2. The system of claim 1, wherein the narrow band transmitter and the narrow band receiver are configured to operate in the Industrial Scientific and Medical (ISM) band.

3. The system of claim 2, wherein the narrow band transmitter and the narrow band receiver are configured to operate at about 2.45 GHz.

4. The system of claim 1, wherein the wideband receiver and the wideband transmitter are configured to operate in the Ultra Wideband (UWB) spectrum.

5. The system of claim 1, wherein each of the plurality of controllers is configured to transmit, using the narrow band transmitter, the timing and control information for the wideband transmitter operation.

6. The system of claim 5, wherein the device is configured to receive the timing and control information, synchronize the wideband transmitter and transmit the positioning frame.

7. The system of claim 6, wherein the plurality of controllers are configured to receive the positioning frame and send information included in the positioning frame to a server.

8. The system of claim 7, wherein the positioning frame includes a time stamp, and wherein the plurality of controllers that receive the positioning frame are configured to determine the time the positioning frame was received.

9. The system of claim 8, wherein the server is configured to use triangulation to determine a position of the device.

10. The system of claim 6, wherein the device uses a superframe to communicate with the controllers via the wideband transmitter, and wherein the timing and control information includes superframe information including a start time of the superframe.

11. The system of claim 1, wherein the device is configured to turn on the wideband transmitter for a short duration in order to transmit the positioning frame and then turn the transmitter off.

12. The system of claim 11, wherein the device is further configured to then turn the narrow band receiver on for a short period in order to receive the acknowledgement frame form one or more of the controllers and then turn the receiver off.

13. The system of claim 12, wherein the device is configured to attempt re-transmission of the positioning frame when it does not receive an acknowledgement in a certain period of time.

14. The system of claim 1, further comprising a server interfaced with the plurality of controllers, the server configured to maintain synchronization between the plurality of controllers.

15. A positioning system comprising:
   a plurality of controllers, each controller comprising a wideband receiver and a narrow band transmitter, the each controller configured to receive a wideband positioning frame using the wideband receiver from one or more devices and to transmit acknowledgement frames using the narrow band transmitter that include timing and control data for use by the devices to establish timing for transmission of the positioning frame;
   at least one device comprising a wideband transmitter and a narrow band receiver, the device configured to transmit the positioning frame to the plurality of controllers using the wideband transmitter and to receive the acknowledgement frame from one or more controllers using the narrow band receiver, extract timing and control information from the acknowledgement frame, and adjust a timing and synchronization of the wideband transmitter using the timing and control information; and
   a server interfaced with the plurality of controllers, the server configured to maintain synchronization between the plurality of controllers.

16. The system of claim 15, wherein the narrow band transmitter and the narrow band receiver are configured to operate in the Industrial Scientific and Medical (ISM) band.

17. The system of claim 16, wherein the narrow band transmitter and the narrow band receiver are configured to operate at about 2.45 GHz.

18. The system of claim 15, wherein the wideband receiver and the wideband transmitter are configured to operate in the Ultra Wideband (UWB) spectrum.

19. The system of claim 15, wherein each of the plurality of controllers is configured to transmit, using the narrow band transmitter, the timing and control information for the wideband transmitter operation.

20. The system of claim 19, wherein the device is configured to receive the timing and control information, synchronize the wideband transmitter and transmit the positioning frame.

21. The system of claim 20, wherein the plurality of controllers are configured to receive the positioning frame and send information included in the positioning frame to the server.

22. The system of claim 21, wherein the positioning frame includes a time stamp, and wherein the plurality of controllers that receive the positioning frame are configured to determine the time the positioning frame was received.

23. The system of claim 22, wherein the server is configured to use triangulation to determine the position of the device.

24. The system of claim 20, wherein the device uses a superframe to communicate with the controllers via the wideband transmitter, and wherein the timing and control information includes superframe information including a start time of the superframe.

25. The system of claim 15, wherein the device is configured to turn on the wideband transmitter for a short duration in order to transmit the positioning frame and then turn the transmitter off.

26. The system of claim 25, wherein the device is further configured to then turn the narrow band receiver on for a short period in order to receive the acknowledgement frame form one or more of the controllers and then turn the receiver off.

27. The system of claim 26, wherein the device is configured to attempt re-transmission of the positioning frame when it does not receive an acknowledgement in a certain period of time.

* * * * *